Aug. 25, 1936.  I. M. LADDON ET AL  2,052,234
AEROPLANE LANDING MEANS
Filed July 29, 1927  3 Sheets-Sheet 1
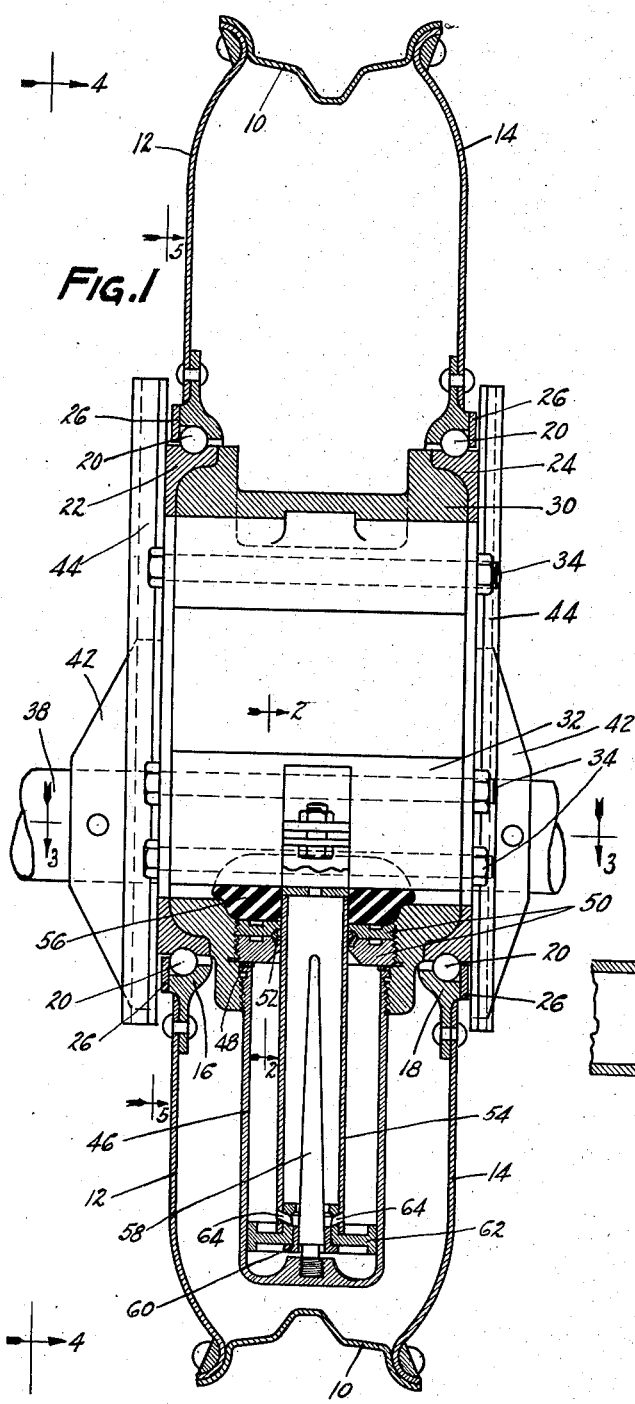
INVENTOR
ISSAC M. LADDON
SIDNEY P. LYON
BY
M. W. McConkey
ATTORNEY Aug. 25, 1936.                I. M. LADDON ET AL                    2,052,234
                            AEROPLANE LANDING MEANS
                              Filed July 29, 1927          3 Sheets-Sheet 2

INVENTOR
ISSAC M. LADDON
SIDNEY P. LYON
BY
ATTORNEY

Aug. 25, 1936.  I. M. LADDON ET AL  2,052,234
AEROPLANE LANDING MEANS
Filed July 29, 1927  3 Sheets-Sheet 3

INVENTOR
ISSAC M LADDON
SIDNEY P LYON
BY
ATTORNEY

Patented Aug. 25, 1936

2,052,234

UNITED STATES PATENT OFFICE 2,052,234

AEROPLANE LANDING MEANS

Isaac M. Laddon, Dayton, and Sidney P. Lyon, Tippecanoe City, Ohio, assignors, by direct and mesne assignments, to Bendix Aviation Corporation, South Bend, Ind., a corporation of Delaware Application July 29, 1927, Serial No. 209,227

26 Claims. (Cl. 267—64)

This invention relates to landing gear for aeroplanes and the like, and is illustrated as embodied in a wheel mounting including novel means for taking the shock when the aeroplane lands on the ground so that there will be no tendency to rebound.

One important feature of the invention relates to arranging the parts so that there is a single gradual vertical movement of the plane with respect to the wheels as the plane lands, after which the load of the plane is transmitted directly to the wheels while manouvering on the ground. When the plane again rises into the air the weight of the wheels reverses the action of the shock absorbing means and returns all the parts to their initial positions ready to go into action again when the plane lands. Preferably the novel shock absorber includes a fluid-containing cylinder, and a piston, and is arranged to force the fluid in the cylinder past the piston in landing. The particular arrangement illustrated in the drawings includes also a device, such as a tapered plunger extending through an opening in the piston, for gradually throttling the flow of fluid as the piston stroke progresses.

Another feature of the invention relates to arranging a shock absorbing means such as the one described above inside of a rotatable hollow wheel supporting the plane or other vehicle so that the entire mechanism is housed within the wheel, thus giving substantially a stream-line effect which minimizes air resistance.

Other features of novelty relate to the construction and mounting of the wheel itself, and to other novel arrangements and desirable particular constructions which will be apparent from the following description of one illustrative embodiment shown in the accompanying drawings, in which:

Figure 1 is a vertical section through the wheel and the novel shock absorbing means;

Figure 2 is a side elevation of the upper part of the piston substantially on the line 2—2 of Figure 1, and showing the arrangement for fastening it to the axle;

Figure 3 is a section through part of the axle substantially on the line 3—3 of Figure 1 and showing the arrangement for forcing fluid into the shock absorbing means;

Figure 4:
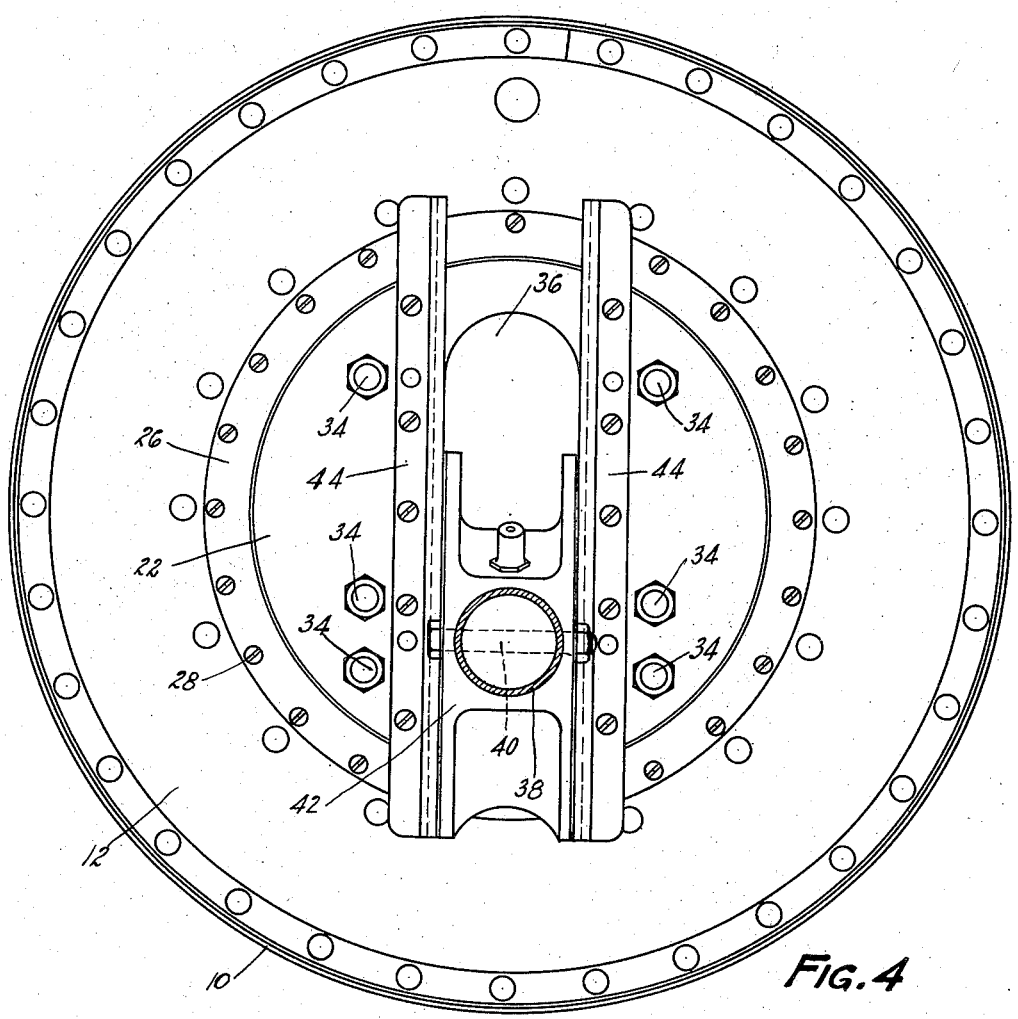
Figure 4 is a vertical section on the line 4—4 of Figure 1 and showing the wheel in side elevation.
Figure 5:
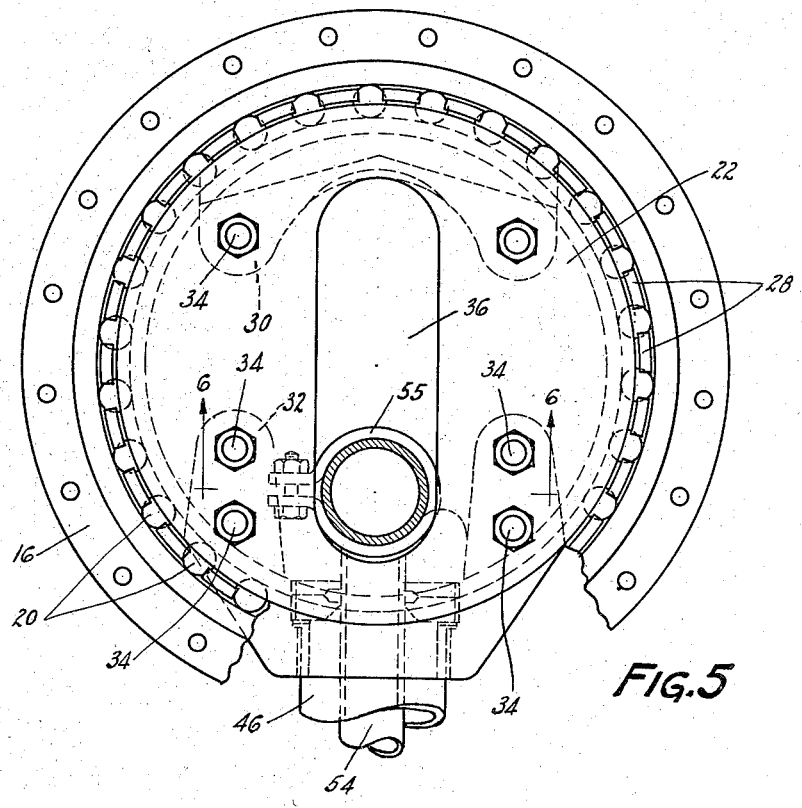
Figure 5 is a partial section substantially on the line 5—5 of Figure 1 and showing the wheel mounting.
Figure 6:
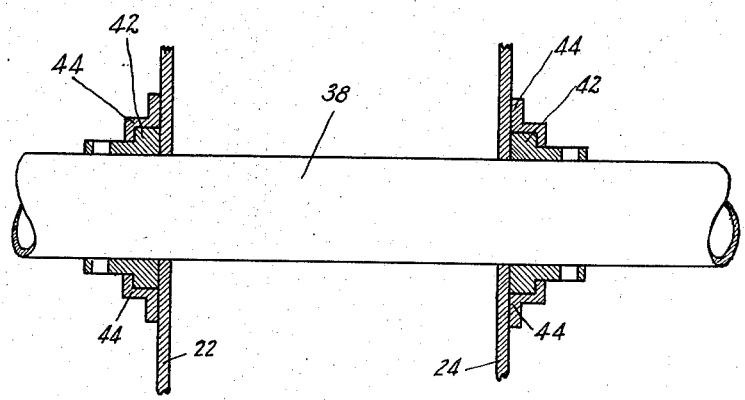
Figure 6 is a partial section on the line 6—6 of Figure 5 and showing the axle mounting.

The arrangement illustrated in the drawings, and which is intended for use as part of the landing gear of an aeroplane, includes a drop center rim 10 adapted to receive the usual rubber tire, and to opposite sides of which are secured annular disks 12 and 14 to which races 16 and 18 are secured at their inner edges. The rim 10 and the disks 12 and 14 are preferably made of relatively light metal such as duraluminum.

Races 16 and 18 form part of anti-friction bearings including balls or the like 20 arranged in cooperating races formed in side members 22 and 24 and confined partly against thrust by side rings 26. The side rings 26 are secured by screws 28 or the like to the races 16 and 18. Separators 28 of any desired form may be arranged between the balls 20 of the anti-friction bearings.

The side members 22 and 24 are rigidly spaced apart by upper and lower forgings or castings or similar members 30 and 32, which are arranged between the side members and which are secured thereto by a series of bolts 34 passing through them and through the side members. The side members 22 and 24 are formed with vertical slots 36 through which passes a tubular axle 38. The axle 38 is connected by cross pins 40, or equivalent means preventing it from turning, to slides 42 arranged in guides 44 riveted or otherwise secured to the side members 22 and 24, thus permitting the axle to move vertically in slots 36 but preventing it from turning.

The lower member 32 has a vertically arranged cylinder 46 threaded or otherwise secured at its lower end and immediately below the axle 38, in the space between the side disks 12 and 14. The cylinder 46 is illustrated as threaded in place against a fluid-confining gasket 48 held by two bushings 50 threaded in place in such a manner as to hold a packing 52 for a hollow piston 54 having a clamp 55 at its upper end encircling and secured to the axle 38. Above the bushings 50 there is arranged a block 56 of rubber or the like on which the axle 38 rests when in its lowermost position. The cylinder 46 also carries a throttling device, such as a tapered plunger 58 passing through an opening in a bushing 60 arranged in the head 62 of the hollow piston 54. The opening in the bushing 60 communicates by lateral passages 64 with the space in the cylinder 46 above the head 62 of the piston.

In the operation of the parts described above, when the plane is on the ground the axle 38 is resting on the block 56 of rubber and the parts are in the position shown in Figure 1. When the plane rises into the air, however, the weight of the wheel causes it to move downwardly, thus in effect moving the slides 42 and the axle 38 upwardly in the slots 36. During this movement the oil or other fluid in the upper part of the cylinder 46 passes downwardly through the passages 64 and through the central opening in the bushing 62 into the lower end of the cylinder 46. Or, if the wheel is regarded as stationary, the piston 54 is drawn downwardly by the axle 38 into a position at the end of cylinder 46. This movement may be very slow so that there is practically no resistance to the flowing of the oil or other fluid from above the head 62 of the piston to the space below the head 62.

When the aeroplane lands, the piston 62 is forced suddenly downward by the weight of the plane on the axle 38, thus forcing the oil or other fluid very rapidly through the central passage of the bushing 60 and through passages 64 into that part of the cylinder 46 which is above the head 62 of the passage. This movement is so rapid that the passage of the fluid through these restricted spaces is powerfully retarded, thus transforming the kinetic energy acting through the axle 38 into heat,—that is, the device acts as a brake efficiently resisting sudden vertical movement of the axle 38 and forcing it to come gradually to rest on block 56 forming its support in its normal position when on the ground. The tapering of the plunger 58 causes a gradual throttling of the flow of fluid, and the taper of the plunger is so proportioned with respect to the opening in bushing 60 that a constant hydraulic pressure is maintained throughout the working stroke of the piston 54, thus absorbing the maximum energy of impact with a minimum strain on the entire structure.

In Figure 3 is shown one means of introducing oil or other fluid into the above-described novel shock absorbing means. As shown in this figure, there may be a head 70 closing the end of the hollow axle 38 while some distance from the end of the axle there is arranged a block 72 of wood or other material, thus forming a chamber 74 in the end of the axle communicating by an opening 76 with the interior of the oil piston 54, and thence through the passages 64 to the cylinder 46. A check valve 76 of any usual and desired form is provided in the head 70 for introducing oil or other fluid into the chamber 74 and thence into the cylinder 46. While we prefer to fill the piston 46 and the chamber 74 substantially full of a non-compressible fluid such as oil, it is feasible to fill the cylinder 46 nearly full of such a non-compressible fluid and then to introduce highly compressed air or the like into the upper part of the cylinder 46 and into the chamber 74.

While one illustrative embodiment of the invention has been described in detail, it is not our intention to limit the scope of the invention to that particular embodiment or otherwise than by the terms of the appended claims.

We claim:

1. In combination in an aeroplane shock absorber for landing chassis, a liquid damping means for absorbing the initial shock of landing without rebound having a metering orifice and a device for resiliently supporting the load independent of said orifice effective only after the initial shock of landing has been absorbed.

2. In combination in an aeroplane shock absorber, a casing, a liquid damping means therein for absorbing the major initial shock of landing without rebound, and a resilient device therein for resiliently supporting the load, and effective to resiliently support the load only after the major initial shock of the landing has been absorbed by said liquid damping means.

3. A shock absorber of the class described comprising liquid damping means for absorbing initial shocks without substantial rebound, and additional means for resiliently receiving additional shocks and ineffective during the absorption of said initial shocks.

4. In a shock absorber of the class described, in combination, a cylinder, a piston movably received in said cylinder, liquid damping means for absorbing the initial shock without substantial rebound, and a spring means for resiliently restraining movements of the piston and effective only after large degrees of movement of the piston within the cylinder.

5. In a device of the class described adapted to absorb the energy of exerted compressive forces, means for initially absorbing the energy of an exerted compressive force at a substantially constant rate, an additional means brought into operation when the first means has reached a predetermined positioning under the influence of said compressive forces for additionally absorbing energy of compressive forces.

6. In a device of the class described adapted to absorb the energy of exerted compressive forces, means for initially absorbing the energy of an exerted compressive force without substantial rebound, and additional means brought into operation when the first means has reached a predetermined positioning under the influence of said compressive forces for additionally absorbing energy of succeeding compressive forces in a resilient manner.

7. A shock absorber for supporting a vehicle comprising a casing, a liquid damping means having an orifice in said casing for absorbing shocks, and a resilient spring device in said casing independent of said orifice for resiliently supporting the load, said liquid damping means acting to restrict rebound of the spring device.

8. A device of the character described including a cylinder and a piston, the latter including a piston-rod restricted to a single central opening in its head to permit displacement of a fluid therethrough and having means above the piston for assisting in restricting the displacement of a fluid through the piston to establish and maintain communication between the contents of the cylinder on both sides of the piston at all times, a tapered metering pin within the cylinder having its upper end extending through the said opening in the piston-head to provide a space around the tapered metering pin, the whole arranged in such manner that upon inward movement of the piston in the cylinder, the displacement of the fluid below the piston head is progressively restricted by the progressively diminishing area of the space in the piston head around the tapered metering pin to control displacement of fluid through the piston head in either direction and upon outward movement of the piston in the cylinder, a rapid displacement of the fluid from above the piston is restricted by the said displacement restricting means above the piston.

9. In an aeroplane shock absorbing landing gear, a wheel including a liquid damping means for absorbing the initial shock of landing, and means for resiliently supporting the load effective after the initial shock of landing has been absorbed.

10. In an aeroplane shock absorbing landing gear, a wheel including a liquid damping means for absorbing the initial shock of landing without rebound, and a device for resiliently supporting the load effective only after the initial shock of landing has been absorbed.

11. In an aeroplane shock absorbing landing gear, a wheel including a liquid damping means therein for absorbing the major initial shock of landing without rebound, and a resilient device therein for resiliently supporting the load, and effective to resiliently support the load only after the major initial shock of landing has been absorbed by said liquid damping means.

12. In an aeroplane shock absorbing landing gear, a wheel including a liquid damping means for absorbing initial shocks without substantial rebound, and additional means for resiliently receiving additional shocks and ineffective during the absorption of said initial shocks.

13. In an aeroplane shock absorbing landing gear, a wheel including, a cylinder, a piston movably received in said cylinder, liquid damping means for absorbing an initial shock without substantial rebound, and spring means for resiliently restraining movements of the piston and effective only after large degrees of movement of the piston within the cylinder.

14. In an aeroplane shock absorbing landing gear, a wheel including means for initially absorbing the energy of an exerted compressive force at a substantially constant rate and additional means brought into operation when the first means has reached a predetermined positioning under the influence of said compressive forces for additionally absorbing energy of compressive forces.

15. In an aeroplane shock absorbing landing gear, a wheel including means for initially absorbing the energy of an exerted compressive force without substantial rebound, and additional means brought into operation when the first means has reached a predetermined positioning under the influence of said compressive forces for additionally absorbing energy of succeeding compressive forces in a resilient manner.

16. In an aeroplane shock absorbing landing gear, a wheel including liquid damping means encased within said wheel for absorbing shocks, and a resilient spring device for resiliently supporting the load encased within said wheel, said liquid damping means acting to restrict rebound of the spring device.

17. An aeroplane shock absorbing device comprising a cylinder, and a piston, a piston rod projecting from the top of said cylinder, a member forming a shoulder on the end of said piston rod, and an annular resilient member threaded on said rod and adapted to be compressed between said shoulder and cylinder.

18. An aeroplane shock absorbing device comprising, cylinder, piston and piston rod, means for absorbing and dissipating shock energy, and resilient means threaded on said piston rod exterior to said cylinder and coacting with engaging means on said rod for resiliently absorbing shock energy.

19. An aeroplane shock absorbing device comprising a support, a cup-shaped cylinder depending from and secured to said support, a piston having a central orifice within said cylinder, a tubular piston rod secured to said piston and projecting from the top of said cylinder, an end closure and gland for said cylinder and tubular rod, a member forming a shoulder carried by said piston rod on its outer end, and a resilient annular member threaded on said piston rod adapted to resiliently engage said shoulder to absorb shocks.

20. An aeroplane shock absorbing device comprising a liquid damping means having reciprocating parts and a liquid chamber for absorbing the initial shock of landing without rebound and a spring device wholly without the liquid chamber and coaxially mounted with respect thereto for resiliently supporting the load effective only after the initial shock of landing has been absorbed.

21. A shock absorber of the class described comprising cylinder and piston liquid damping means for absorbing initial shocks without substantial rebound, and additional means coaxially arranged at one end of said damping means for resiliently receiving additional shocks and for supporting the full load, and ineffective during the absorption of said initial shocks.

22. An aeroplane shock absorbing device comprising a cylinder having a closed lower end, a piston having an aperture adapted to reciprocate therein, a top closure for the cylinder, a piston rod extending through the top closure of the cylinder, a member forming a shoulder on the piston rod, and a resilient annular member threaded on said rod and resting on the top closure and adapted to be engaged by the shoulder on said rod, whereby the resilient member is adapted to resiliently absorb shock.

23. A shock absorber of the class described, comprising liquid damping means for absorbing initial shocks without substantial rebound and at a substantially constant rate having telescopic casings and a metering orifice, said casings containing liquid and gas under pressure, and an additional means for resiliently receiving additional shocks and ineffective during obsorption of said initial shocks.

24. A shock absorber of the class described, comprising liquid damping means for absorbing initial shocks without substantial rebound and at a substantially constant rate, air under pressure in said damping means, and an additional means for resiliently receiving additional shocks and ineffective during the absorption of said initial shocks.

25. An aeroplane shock absorbing device comprising cylinder and piston liquid damping means for absorbing initial shocks without substantial rebound, said piston having a hollow piston rod, and additional means coaxially arranged at one end of said damping means and around said piston rod for resiliently receiving said additional shocks and for supporting the load, and ineffective during the absorption of said initial shocks.

26. An aeroplane shock absorbing device comprising a liquid damping means having reciprocating parts and a liquid chamber for absorbing the initial shock of landing without rebound, said means comprising a pair of telescopic cylinders one inside the other, a packing means carried by the outer cylinder and a piston carried by the inner, and resilient means wholly outside the liquid chamber and carried on the exposed portion of the inner cylinder, said resilient means adapted to be placed under compression only after initial movement between said telescopic cylinders.

ISAAC M. LADDON.
SIDNEY P. LYON.